(12) United States Patent
Huang

(10) Patent No.: US 8,462,999 B2
(45) Date of Patent: Jun. 11, 2013

(54) ELECTRONIC SYSTEMS AND METHODS FOR REPAIRING SCAR IMAGES

(75) Inventor: Wen-Hung Huang, Taichung (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 130 days.

(21) Appl. No.: 13/277,716

(22) Filed: Oct. 20, 2011

(65) Prior Publication Data

US 2012/0099786 A1    Apr. 26, 2012

(30) Foreign Application Priority Data

Oct. 22, 2010    (TW) ............................... 99136063 A

(51) Int. Cl.
*G06K 9/00*    (2006.01)
*H04N 9/73*    (2006.01)

(52) U.S. Cl.
USPC .................. 382/118; 382/275; 348/223.1

(58) Field of Classification Search
USPC ............... 382/100, 103, 108, 118, 123, 128, 382/162, 168, 173, 181, 219–220, 232, 254, 382/274, 275–276, 287, 305, 309, 312; 345/629; 348/222.1, 223.1
See application file for complete search history.

(56) References Cited

U.S. PATENT DOCUMENTS

| | | | |
|---|---|---|---|
| 7,181,091 B2 * | 2/2007 | Yoda | 382/309 |
| 7,636,485 B2 * | 12/2009 | Simon et al. | 382/254 |
| 8,384,793 B2 * | 2/2013 | Ciuc et al. | 348/222.1 |
| 2005/0058362 A1 * | 3/2005 | Kita | 382/254 |
| 2009/0136101 A1 * | 5/2009 | Chhibber et al. | 382/128 |
| 2010/0118052 A1 * | 5/2010 | Tsue et al. | 345/629 |

* cited by examiner

*Primary Examiner* — Seyed Azarian
(74) *Attorney, Agent, or Firm* — McClure, Qualey & Rodack, LLP

(57) ABSTRACT

A method for repairing scar images is provided, in which a facial region of an image is detected, a first average skin tone value is subtracted from an original pixel value of at least one pixel to generate a first mask value, the first mask value is divided by a constant to generate a first modified mask value; and the first modified mask value is added to the first average skin tone value to generate a first pixel value to serve as a compensated scar pixel value of the pixel.

18 Claims, 7 Drawing Sheets

| | | | | | | | | | | | | |
|---|---|---|---|---|---|---|---|---|---|---|---|---|
| 104 | 102 | 101 | 102 | 99 | 100 | 100 | 99 | 102 | 100 | 102 | 104 | 102 |
| 102 | 101 | 104 | 103 | 102 | 101 | 101 | 100 | 101 | 99 | 104 | 102 | 101 |
| 100 A1 | 102 A6 | 103 A11 | 102 A16 | 101 A21 | 101 A26 | 101 A31 | 99 A36 | 102 A41 | 100 | 102 | 101 | 99 |
| 101 A2 | 102 A7 | 100 A12 | 99 A17 | 101 A22 | 101 A27 | 102 A32 | 102 A37 | 100 A42 | 101 | 99 | 102 | 98 |
| 100 A3 | 99 A8 | 98 A13 | 101 A18 | 101 A23 | 101 A28 | 101 A33 | 100 A38 | 101 A43 | 99 | 101 | 102 | 102 |
| 100 A4 | 98 A9 | 101 A14 | 99 A19 | 101 A24 | 103 A29 | 131 A34 | 129 A39 | 131 A44 | 99 | 100 | 101 | 101 |
| 101 A5 | 100 A10 | 102 A15 | 98 A20 | 101 A25 | 103 A30 | 132 A35 | 133 A40 | 130 A45 | 98 | 99 | 98 | 101 |
| 103 | 104 | 101 | 102 | 100 | 133 | 130 | 129 | 99 | 103 | 101 | 103 | 104 |
| 102 | 101 | 102 | 104 | 99 | 100 | 99 | 101 | 101 | 104 | 102 | 102 | 101 | facial region / non-facial region first direction →

ELECTRONIC SYSTEMS AND METHODS FOR REPAIRING SCAR IMAGES

CROSS REFERENCE TO RELATED APPLICATIONS

This Application claims priority of Taiwan Patent Application No. 099136063, filed on Oct. 22, 2010, the entirety of which is incorporated by reference herein.

BACKGROUND OF THE INVENTION

1. Field of the Invention

The present invention relates to an image processing method, and in particular relates to a method for repairing scar images.

2. Description of the Related Art

With progress in electronic technology, electronic systems for repairing scars of a facial image have become more and more popular. However, the skill in the prior art uses a complicated depth first search (DFS) procedure. Complicated circuits are used to implement the DFS procedure, thus, increasing power consumption of the electronic system. Therefore, there is a need for a simple method and an electronic system to repair scar images.

BRIEF SUMMARY OF THE INVENTION

In light of the previously described problem, the invention provides an embodiment of a method for repairing scar images. The method comprises the steps of: detecting a facial region of an image; subtracting a first average skin tone value from an original pixel value of at least one pixel to generate a first mask value; dividing the first mask value by a constant to generate a first modified mask value; and adding the first modified mask value to the first average skin tone value to generate a first pixel value to serve as a compensated scar pixel value of the pixel.

The invention also provides an embodiment of an electronic system, capable of implementing a method for repairing scar images, comprising a memory and a processing unit. The memory stores at least one image. The processing unit detects a face region of the image, subtracts a first average skin tone value from an original pixel value of at least one pixel to generate a first mask value, divides the first mask value by a constant to generate a first modified mask value, and adds the first modified mask value to the first average skin tone value to generate a first pixel value to serve as a compensated scar pixel value of the pixel.

The invention also provides a method for repairing scar images. The method comprises the steps of: determining whether at least one pixel of an image is in a sharp area; generating a weight value corresponding to the pixel according the determination; subtracting a first average skin tone value from an original pixel value of the pixel to generate a first mask value; dividing the first mask value by a constant to generate a first modified mask value; adding the first modified mask value to the first average skin tone value to generate a first pixel value to serve as a compensated scar pixel value of the pixel; and generating a second average skin tone value for sequent time according to the first pixel value and the weight value corresponding to the pixel.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 2 illustrates a diagram before the pixels A21~A25 are processed in which the sliding window SW is shifted to the pixels A1~A25 in the first direction;

FIG. 3 illustrates a diagram after the pixels A21~A25 are processed in which the sliding window SW is shifted to the pixels A1~A25 in the first direction;

FIG. 5 illustrates a diagram after the pixels A26~A30 are processed in which the sliding window SW is shifted to the pixels A6~A30 in the first direction;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
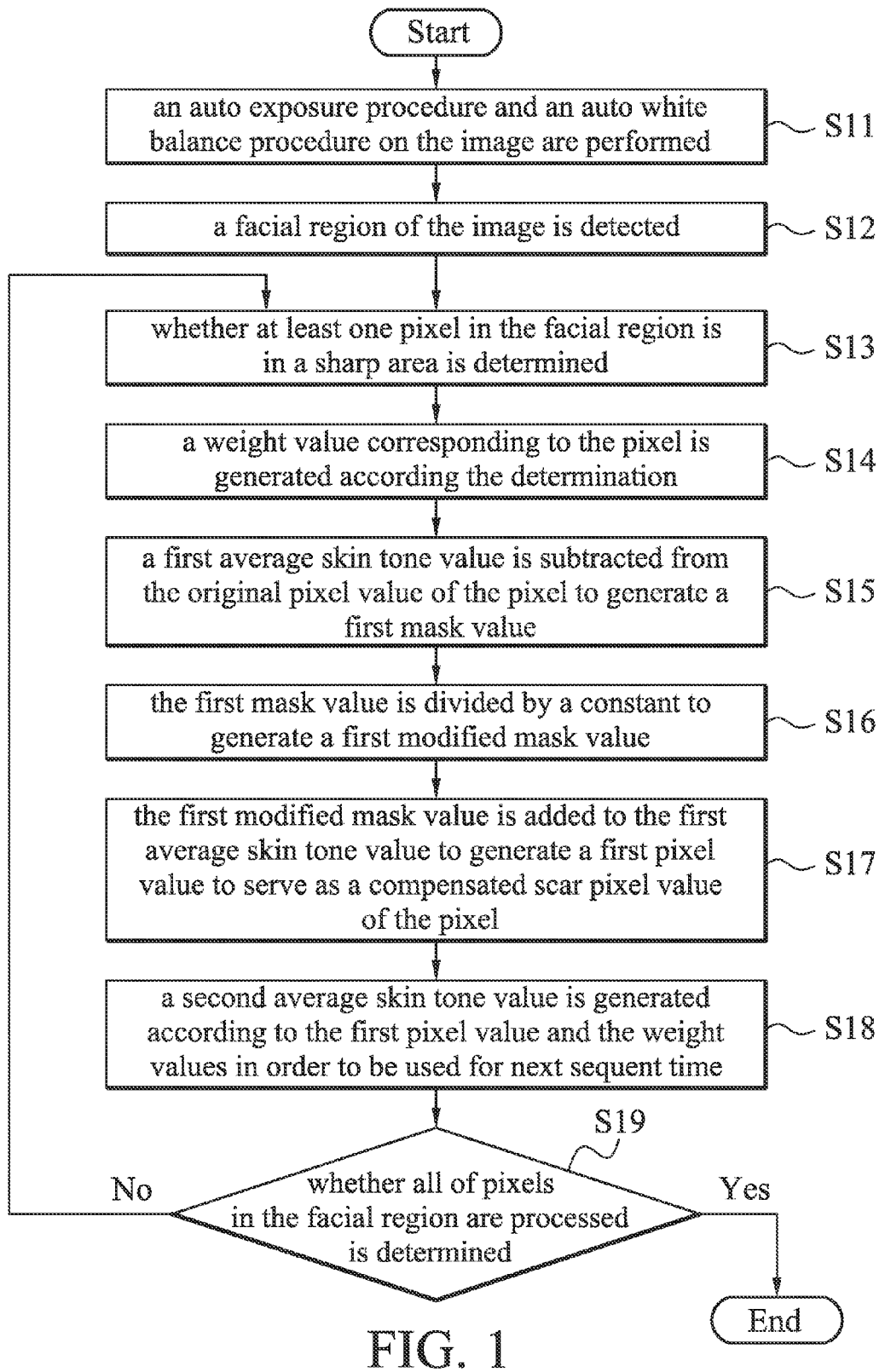
FIG. 1 illustrates a flowchart of the method for repairing scar images of the invention.

Embodiments of the invention provide a method for repairing scar images. FIG. 1 illustrates a flowchart of the method for repairing scar images of the invention.

In step S11, an auto exposure (AE) procedure and an auto white balance (AWB) procedure on the image are performed. An extracted image approaches the real object after performing the AE procedure and the AWB procedure. The AWB procedure modifies the light and shade of an image for color compensation. Colors for an object may be changed due to projected light. The human eye can automatically correct color variation but a camera lens does not provide such a function. Thus, the AWB procedure enables a camera to achieve color variation, presenting real whites based on different conditions by calculating an illumination average and automatically adjusting color balance. Alternatively, the AWB procedure calculates illumination according to image attributes and adjusts color degrees of red, green, and blue to correct color bias.

In step S12, a facial region of the image is detected. In this embodiment, the facial region is determined by using a face lower threshold and a face upper threshold. Further, a region, having an original average skin tone, is defined by a face-noise lower threshold and a face-noise upper threshold. Next, pixel values of pixels in the region of the original average skin tone are averaged to generate an original average skin tone value, wherein the pixel values are defined in an RGB domain (referred to as pixel values hereinafter). In some embodiments, the pixel values can be luminance values.

During a procedure for processing an image frame, the sliding window on the top row of the image frame is shifted in a first direction. When the top row of the image frame is processed, the sliding window on the next row is shifted in the first direction until the whole image frame is processed. In some embodiments, the first direction can be from right to left, from up to down, from down to up or from left to right, but is not limited thereto. When the sliding window is shifted out of the facial region, no procedure is performed. When the sliding window is shifted to the facial region, pixels on the right side of the sliding window are processed.

In step S13, whether at least one pixel in the facial region is in a sharp area is determined. For example, the pixel in a sharp area is determined according to whether a sum of differences between the original pixel value of the pixel and pixel values of adjacent pixels is higher than a sharp threshold. In some embodiments, whether a target pixel is in the sharp area is determined according to a formula 1 as shown: E=(2S0−L1−R1)+(2S0−L2−R2)+(2S0−U1−D1)+(2S0−U2−D2), in which E is a pixel value difference, S0 is a pixel value of the target pixel, and L1 and L2 are pixel values of the first and the second pixels in the left side of the target pixel, respectively. R1 and R2 are pixel values of the first and the second pixels in the right side of the target pixel, respectively. U1 and U2 are pixel values of the first and the second pixels in the top side of the target pixel, respectively. D1 and D2 are pixel values of the first and the second pixels in the bottom side of the target pixel, respectively. When the pixel value difference E is higher than the sharp threshold, the target pixel in the sharp area is determined. When the pixel value difference E is lower than the sharp threshold, the target pixel in the smooth area is determined.

In step S14, a weight value corresponding to the pixel is generated according the determination. For example, if the pixel in the sharp area is determined (i.e., the pixel value difference E>the sharp threshold), the weight value corresponding to the pixel is a weight value $W_{sharp}$. If the pixel in the smooth area is determined (i.e., the pixel value difference E<the sharp threshold), the weight value corresponding to the pixel is a weight value $W_{smooth}$. In some embodiments, the weight values can be stored in a lookup table, but are not limited thereto.

In step S15, a first average skin tone value is subtracted from the original pixel value of the pixel to generate a first mask value. In step S16, the first mask value is divided by a constant to generate a first modified mask value. Next, in step S17, the first modified mask value is added to the first average skin tone value to generate a first pixel value to serve as a compensated scar pixel value of the pixel.

In step S18, a second average skin tone value is generated according to the first pixel value and the weight values $W_{sharp}$ or $W_{smooth}$ in order to be used for next sequent time (i.e., periods of processing a next row of the image frame). The second average skin tone value is generated by using a formula 2 according to the first pixel value and the weight values $W_{sharp}$ or $W_{smooth}$. The second average skin tone value is an average skin tone value for next sequent time (i.e., periods of processing next row of the image frame). In this embodiment, the formula 2 is a weighted average formula, but is not limited thereto. For example, the weighted average formula can be $$F = \frac{\sum_{i=n}^{n+K-1} W_i A_i}{\sum_{i=n}^{n+K-1} W_i},$$

in which F is the second average skin tone value, $W_i$ is a weight value corresponding to a pixel Ai, $A_i$ is a pixel value of the pixel Ai, and K is a number of pixels in a sliding window SW.

In step S19, whether all of pixels in the facial region are processed is determined. If any pixel in the facial region is not processed, the procedure goes to step S13 until all of pixels in the facial region are processed.

Embodiments of the invention are provided to explain the invention, in which the sliding window SW is a sliding window with 5×5 blocks (i.e., K is 25), but is not limited thereto. A block represents a pixel. During the procedure, the direction of the movement of the sliding window SW is the arrow shown in FIG. 2 to FIG. 6; that is, the sliding window SW scans in the first direction. When one of the 5×5 blocks of the sliding window SW is out of the facial region, no procedure is performed. When all of the 5×5 blocks of the sliding window SW go into the facial region (i.e., 25 pixels of the sliding window SW are all in the facial region), this moment is set for a period t1 to process five pixels on the right side of the sliding window SW. For example, the pixel value of the pixel A1 is 100 and the pixel value of the pixel A2 is 101, and so on.

Figure 2:
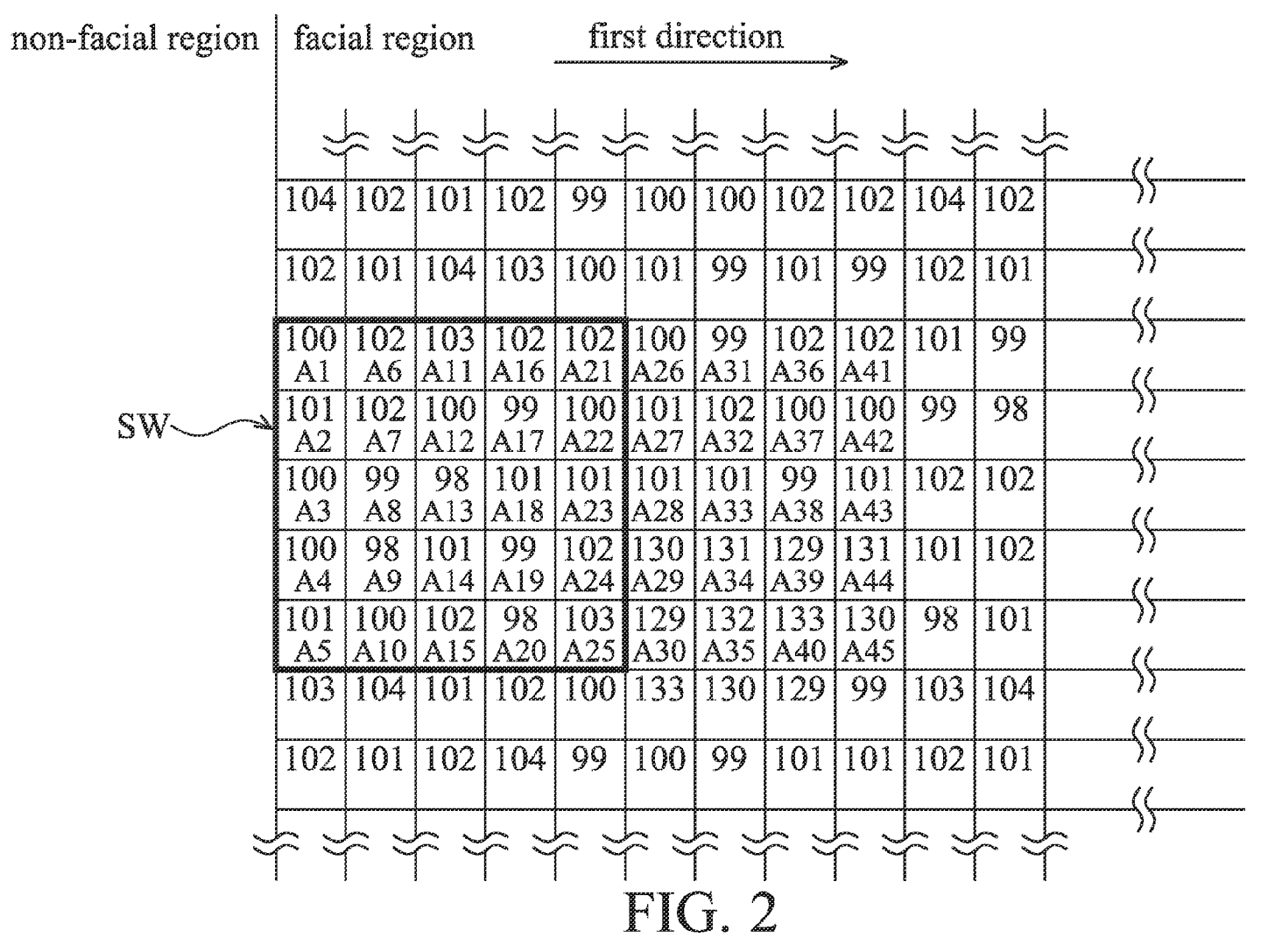

As shown in FIG. 2, when the 5×5 block of the sliding window SW is shifted to the pixels A1~A25, the procedure, which is described as the step S13, is to determine whether the pixels A1~A25 are in a sharp area. For example, first, the pixel A21 is set for the target pixel. In other words, the pixel value of the pixel A21 is S0 of the formula 1. According to the formula 1, the pixel value difference E can be calculated as shown as follows: E=((2×102−102−100)+(2×102−103−99)+(2×102−100−100)+(2×102−99−101))=2. In this example, the sharp threshold is 50. The pixel A21 is in the smooth area because the pixel value difference E of the pixel A21 is lower than the sharp threshold. Similarly, because the pixels A22–A25 are all in the smooth area, the weight values corresponding to the pixels A22–A25 are the weight value $W_{smooth}$.

Figure 3:
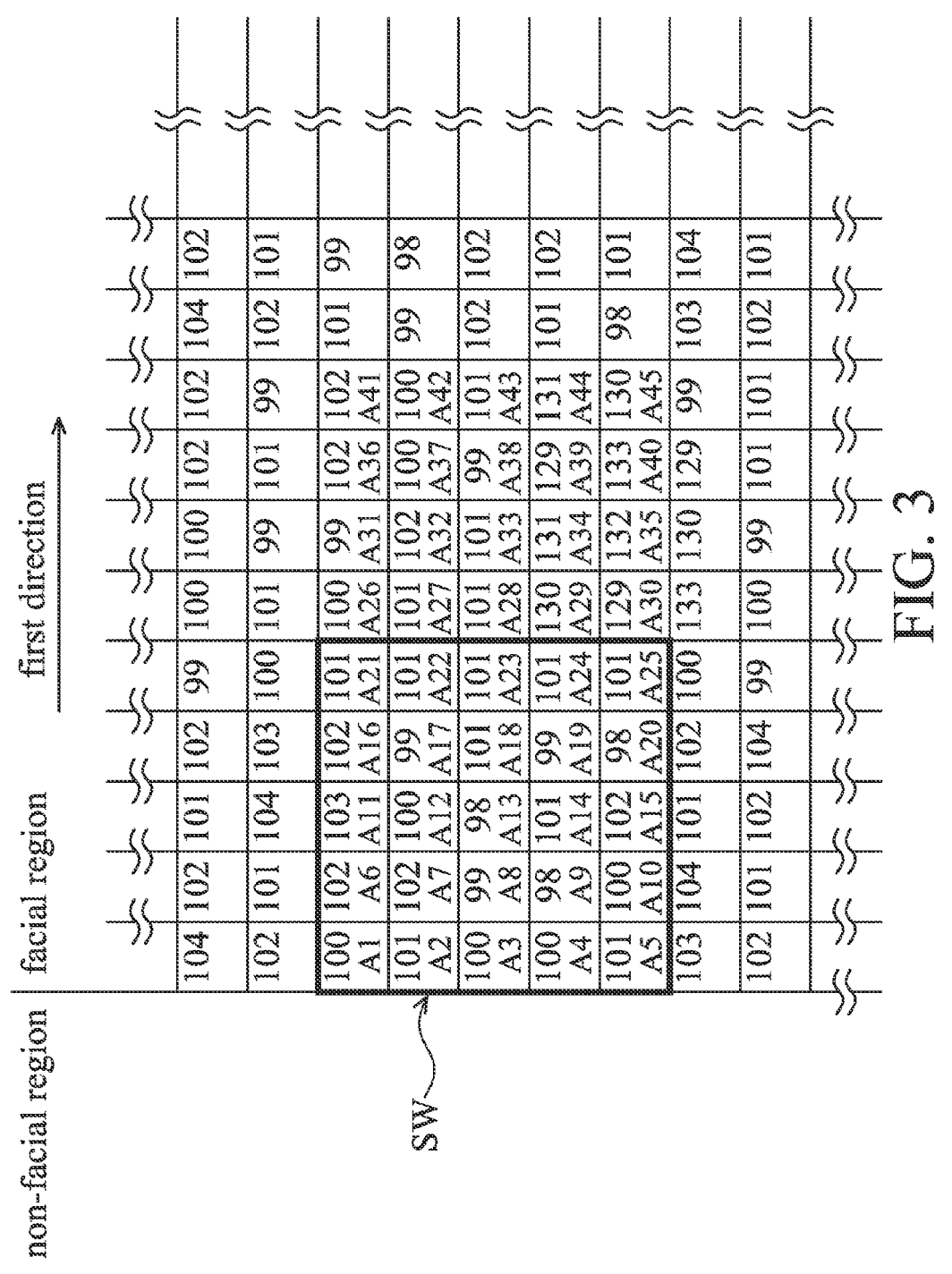

As shown in FIG. 3, in step S15, the first average skin tone value is subtracted from each pixel values of the pixels A21~A25 to generate first mask values corresponding to the pixels A21~A25. If the first average skin tone value is 101 (i.e., the original average skin tone value), the first mask values of the pixels A21~A25 are 1, −1, 0, 1 and 2, respectively. In step S16, the first mask values are divided by a constant. In this embodiment, the constant is 10 such that the first modified mask values are all 0, i.e., the first decimals of the first modified mask values are rounded off. In some embodiments, the first decimals of the first modified mask values are rounded up or truncated, and so on, but are not limited thereto. Next, in step S17, the first modified mask values are added to the first average skin tone value to generate the first pixel values to serve as the compensated scar pixel values of the pixels. In this embodiment, the first pixel values of the pixels A21~A25 are all 101.

In step S18, a second average skin tone value is generated for a period t2 following the period t1. The second average skin tone value is generated by the formula 2 according to the weight values and the first pixel value(s). For example, the formula 2 can be a weight average formula. In this embodiment, the weight average formula is $$F = \frac{\sum_{i=n}^{n+K-1} W_i A_i}{\sum_{i=n}^{n+K-1} W_i}.$$

The first pixel values of the pixels A21~A25 (i.e., pixel values $A_{21}$~$A_{25}$) and the weight values corresponding to the pixels A21~A25 are plugged into the formula 2. For example, the pixel value $A_{21}$ and the weight $W_{21}$ of the formula 2 are replaced by 101 and 1 (i.e., $W_{smooth}$), respectively. Although the first pixel values of the pixels A1~A20 are not calculated, the pixel values $A_1$~$A_{20}$ and the weight values $W_1$~$W_{20}$ of the formula 2 are replaced by the original average skin tone value (i.e., 101) and 1, respectively, such that the second average skin tone value F is 101.

Figure 4:
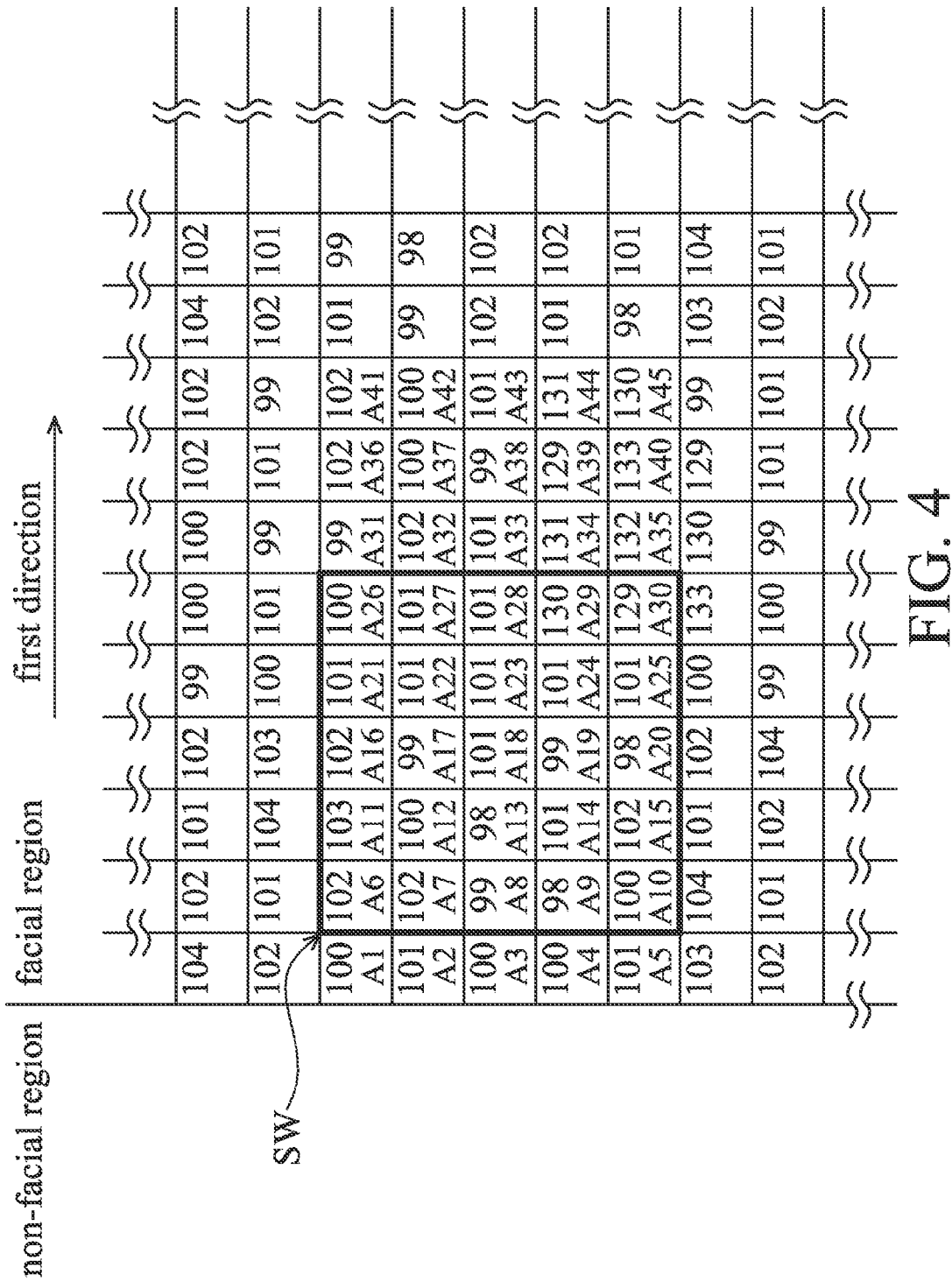
FIG. 4 illustrates a diagram before the pixels A26~A30 are processed in which the sliding window SW is shifted to the pixels A6~A30 in the first direction.

In step S19, whether all of pixels in the facial region are processed is determined. In this moment, some pixels in the facial region are not processed, so the procedure goes to step S13. As shown in FIG. 4, during the period t2, the 5×5 block of the sliding window SW is shifted to the pixels A6~A30, whether the pixels A6~A30 are in a sharp area is determined (i.e., the step S19). The pixel A26 is set for the target pixel; in other words, the pixel value of the pixel A26 is S0 of the formula 1. According to the formula 1, the pixel value difference E can be calculated as shown as follows: E=((2×100−102−99)+(2×100−102−102)+(2×100−101−101)+(2×100−100−101))=−8<the sharp threshold (i.e., 50). The pixel A26 is in the smooth area and the weight value corresponding to the pixel A26 is the weight value $W_{smooth}$. Similarly, because the pixels A26~A28 are all in the smooth area, the weight values corresponding to the pixels A26~A28 are the weight value $W_{smooth}$. In addition, the pixel value difference E of the pixel A29 is calculated as shown as follows: E=((2×130−102−131+(2×130−99−129)+(2×130−101−129)+(2×130−102−133))=115>the sharp threshold (i.e., 50). The pixel A29 is in the sharp area and the weight value corresponding to the pixel A29 is the weight value $W_{sharp}$. Similarly, the pixel A30 is in the sharp area and the weight value corresponding to the pixel A30 is the weight value $W_{sharp}$.

As shown in FIG. 5, the second average skin tone value is subtracted from each original pixel value of the pixels A26~A30 to generate second mask values (i.e., in the step S15). Because the second average skin tone value is 101, the second mask values of the pixels A26~A30 are −1, 0, 0, 29 and 28, respectively. In the step S16, the second mask values of the pixels A26~A30 are divided by a constant (i.e., 10) such that the first second modified mask values are 0, 0, 0, 2 and 2 (i.e., the first decimals of the second modified mask values are rounded off). In step S17, the second modified mask values are added to the second average skin tone value to generate the second pixel values to serve as the compensated scar pixel values of the pixels A26~A30. In this embodiment, the second pixel values of the pixels A26~A30 are 101, 101, 101, 103 and 103, respectively.

In step S18, a third average skin tone value is generated to be used for a period t3 following the period t2. The third average skin tone value is generated by the formula 2 according to the weight values and the second pixel values. In this embodiment, the formula 2 is $$F = \frac{\sum_{i=n}^{n+K-1} W_i A_i}{\sum_{i=n}^{n+K-1} W_i}.$$

The second pixel values of the pixels A26~A30 and the weight values corresponding to the pixels A26~A30 are plugged into the formula 2. For example, the pixel value $A_{26}$ and the weight W26 of the formula 2 are replaced by 101 and 1 (i.e., $W_{smooth}$), respectively. The pixel value $A_{30}$ and the weight W30 of the formula 2 are replaced by 103 and 0.9 (i.e., $W_{sharp}$), respectively. Although the first pixel values of the pixels A6~A20 are not calculated, the pixel values $A_6$~$A_{20}$ and the weight values $W_6$~$W_{20}$ of the formula 2 are replaced by the original average skin tone value (i.e., 101) and 1, respectively, such that the average skin tone value F is calculated as 101, i.e., the first decimals of the average skin tone value F are rounded off. In some embodiments, the first decimals of the average skin tone value F are rounded up or truncated, and so on, but are not limited thereto. Thus is, the third average skin tone value is 101.

Figure 6:
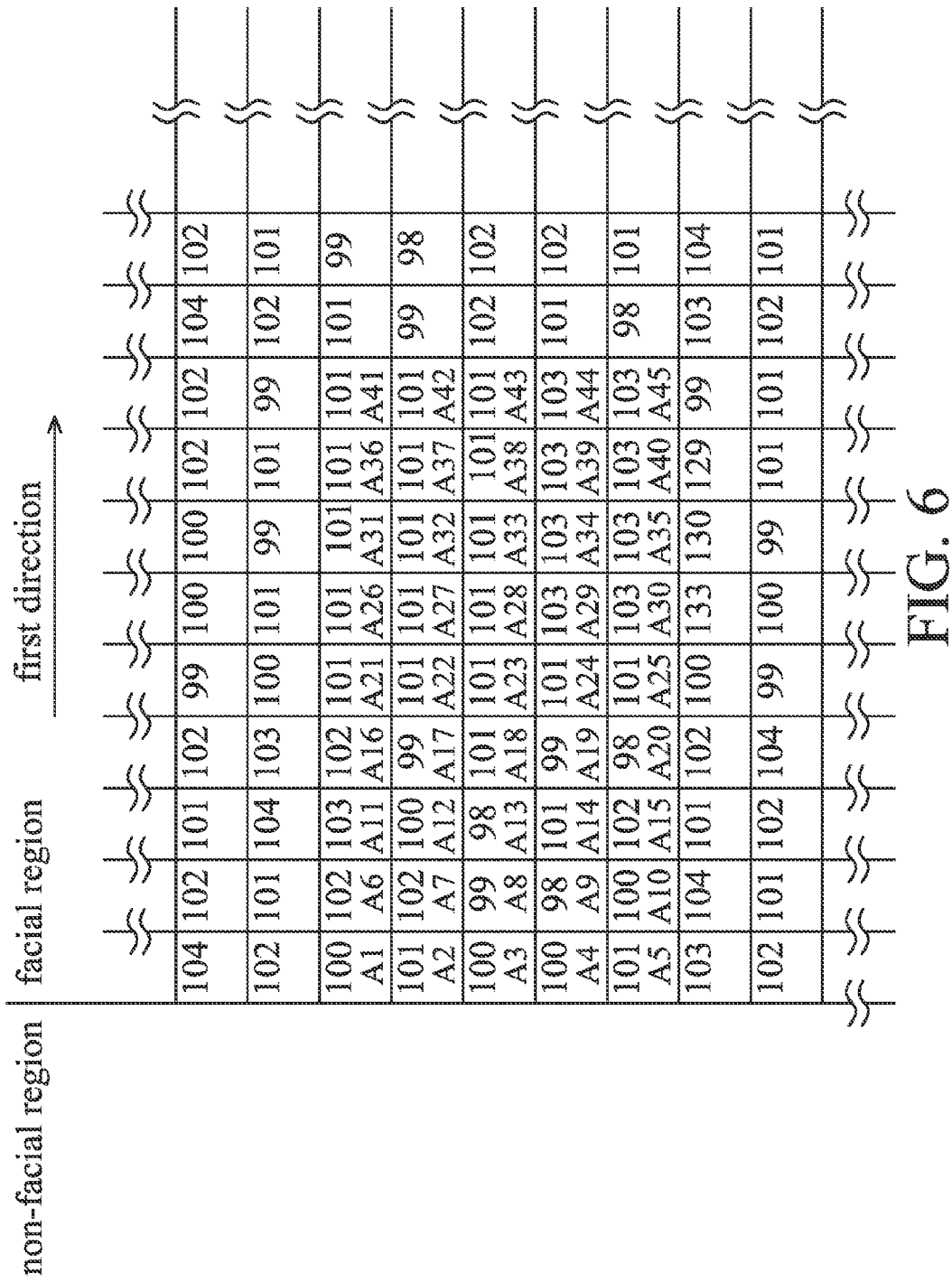
FIG. 6 illustrates a diagram after the pixels A26~A30 are processed in which the sliding window SW is shifted in the first direction.

Whether all of pixels in the facial region are processed is determined (the step S19). At this moment, some pixels in the facial region have not been processed, so the procedure goes to step S13. As shown in FIG. 6, the pixels A31~A35 are processed during a period t3, the pixels A36~A40 are processed during a period t4 and the pixels A41~A45 are processed during a period t5, wherein details of the procedure are omitted for brevity. When all pixels in the first row of the images are processed, pixels in the next row of the image are processed by the sliding window SW in the first direction until all pixels in the facial region are processed.

As shown in FIG. 6, the pixel values of the pixel A29, A30, A34, A35, A39 and A40 approach the pixel values of the neighboring pixels in the smooth region after being compensated for. In other words, the scar in the image is repaired.

The invention also provides an electronic system capable of implementing the method for repairing scar images.

Figure 7:
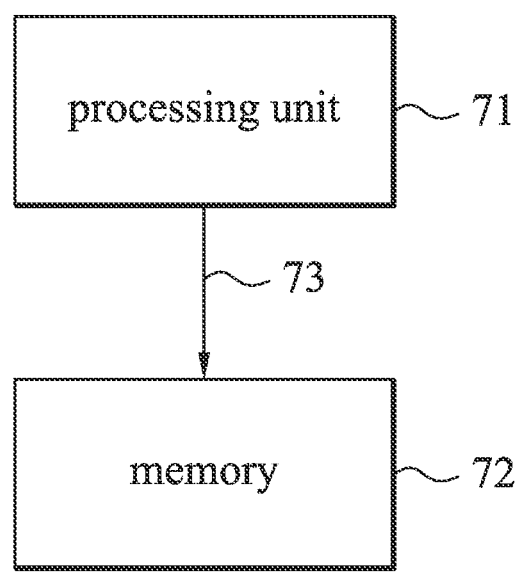
FIG. 7 illustrates an embodiment of the electronic system of the invention.

FIG. 7 illustrates an embodiment of the electronic system. As shown in FIG. 7, the electronic system 70 comprises a processing unit 71, and a memory 72. The processing unit 71 is connected by buses 73 to the memory 72. Note that those skilled in the art will understand that some embodiments may be practiced with other computer system configurations, including handheld devices, personal digital assistant, multi-processor-based, microprocessor-based or programmable consumer electronics, network PCs, minicomputers, mainframe computers, and the like.

The processing units 71 comprises a single central processing unit (CPU), a micro processing unit (MPU) or multiple processing units, commonly referred to as a parallel processing environment. The memory 72 is preferably a random access memory (RAM), but may also include read-only memory (ROM) or flash ROM. The memory 72 preferably stores program modules processed by the processing unit 71 to perform device and service management functions. Generally, program modules include routines, programs, objects, components, or others, that perform particular tasks or implement particular abstract data types. Some embodiments may also be practiced in distributed computing environments where tasks are performed by remote processing devices linked to a communication network. In a distributed computing environment, program modules may be located in both local and remote memory storage devices based on various remote access architecture such as DCOM, CORBA, Web objects, Web Services or other similar architectures.

In this embodiment, the memory 72 stores at least one image. The processing unit 71 performs an auto exposure procedure and an auto white balance procedure on the image and detects the facial region of the image. In addition, the processing unit 71 determines whether the pixel is in a sharp area, and generates the weight value corresponding to the pixel according to the determination. Furthermore, the processing unit 71 subtracts the first average skin tone value from the original pixel value of the pixel to generate the first mask value, divides the first mask value by the constant to generate the first modified mask value, and adds the first modified mask value by the first average skin tone value to generate the first pixel value to serve as the compensated scar pixel value of the pixel. Finally, the processing unit 71 further generates the second average skin tone value used for sequent time according to the first pixel value and the weight value corresponding to the pixel. When the processing unit 71 finishes all pixels in the row of the image by the sliding window SW, pixels in the next row of the image are processed by the sliding window SW in the first direction until all pixels in the facial region are processed.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for repairing scar images, comprising detecting a facial region of an image;
    subtracting a first average skin tone value from an original pixel value of at least one pixel to generate a first mask value;
    dividing the first mask value by a constant to generate a first modified mask value; and
    adding the first modified mask value to the first average skin tone value to generate a first pixel value to serve as a compensated scar pixel value of the pixel;
    wherein a pixel in a sharp area is determined according to whether a sum of differences between the original pixel value of the pixel and pixel values of adjacent pixels is higher than a sharp threshold.

2. The method as claimed in claim 1, further comprising:
    generating a weight value corresponding to the pixel, wherein the weight value corresponding to the pixel is a first weight value when the pixel is in a sharp area, and the weight value corresponding to the pixel is a second weight value when the pixel is not in the sharp area, and wherein the first weight value is different from the second weight value.

3. The method as claimed in claim 2, further comprising generating a second average skin tone value for sequent time according to the first pixel value and the first or second weight values.

4. The method as claimed in claim 3, wherein generation of the second average skin tone value comprises:
    performing a weighted average process on the first pixel value by multiplying the first weight value or the second weight value, thereby performing weighted average to generate the second average skin tone value.

5. The method as claimed in claim 1, further comprising:
    performing an auto exposure procedure and an auto white balance procedure on the image.

6. The method as claimed in claim 1, wherein the original pixel value and the first pixel value are pixel values defined in an RGB domain.

7. An electronic system, capable of implementing a method for repairing scar images, comprising
    a memory, storing at least one image; and
    a processing unit, detecting a face region of the image, subtracting a first average skin tone value from an original pixel value of at least one pixel to generate a first mask value, dividing the first mask value by a constant to generate a first modified mask value, and adding the first modified mask value to the first average skin tone value to generate a first pixel value to serve as a compensated scar pixel value of the pixel, wherein the processing unit further determines a pixel in a sharp area according to whether a sum of differences between the original pixel value of the pixel and pixel values of adjacent pixels is larger than a sharp threshold.

8. The electronic system as claimed in claim 7, wherein the processing unit further generates a weight value corresponding to the pixel, and the weight value corresponding to the pixel is a first weight value when the pixel is in the sharp area, and the weight value corresponding to the pixel is a second weight value when the pixel is not in the sharp area, and wherein the first weight value is different from the second weight value.

9. The electronic system as claimed in claim 8, wherein the processing unit further generates a second average skin tone value used for sequent time according to the first pixel value and the first or second weight values.

10. The electronic system as claimed in claim 9, wherein the processing unit further performing a weighted average process on the first pixel value by multiplies the first weight value or the second weight value to generate the second average skin tone value.

11. The electronic system as claimed in claim 7, wherein the processing unit further performs an auto exposure procedure and an auto white balance procedure on the image.

12. The electronic system as claimed in claim 7, wherein the original pixel value and the first pixel value are pixel values defined in an RGB domain.

13. A method for repairing scar images, comprising
    determining whether at least one pixel of an image is in a sharp area, wherein the pixel in a sharp area is determined according to whether a sum of differences between the original pixel value of the pixel and pixel values of adjacent pixels is higher than a sharp threshold;
    generating a weight value corresponding to the pixel according the determination;
    subtracting a first average skin tone value from an original pixel value of the pixel to generate a first mask value;
    dividing the first mask value by a constant to generate a first modified mask value;
    adding the first modified mask value to the first average skin tone value to generate a first pixel value to serve as a compensated scar pixel value of the pixel; and
    generating a second average skin tone value used for sequent time according to the first pixel value and the weight value corresponding to the pixel.

14. The method as claimed in claim 13, further comprising:
    performing an auto exposure procedure and an auto white balance procedure on the image before the determination of whether the pixel of the image is in the sharp area.

15. The method as claimed in claim 14, wherein the pixel in the sharp area is determined according to whether a sum of differences between the original pixel value of the pixel and pixel values of adjacent pixels is larger than a sharp threshold.

16. The method as claimed in claim 15, wherein the weight value corresponding to the pixel is a first weight value when the pixel is in the sharp area, and the weight value corresponding to the pixel is a second weight value when the pixel is not in the sharp area, and wherein the first weight value is different from the second weight value.

17. The method as claimed in claim 16, wherein generation of the second average skin tone value comprises:
    performing a weighted average process on the first pixel value by multiplying the first weight value or the second weight value to generate the second average skin tone value.

18. The method as claimed in claim 13, wherein the original pixel value and the first pixel value are pixel values defined in an RGB domain.

\* \* \* \* \*